March 27, 1951     A. Y. DODGE     2,546,633
SPEED AND TORQUE RESPONSIVE COUPLING
Filed Feb. 8, 1946     2 Sheets-Sheet 1
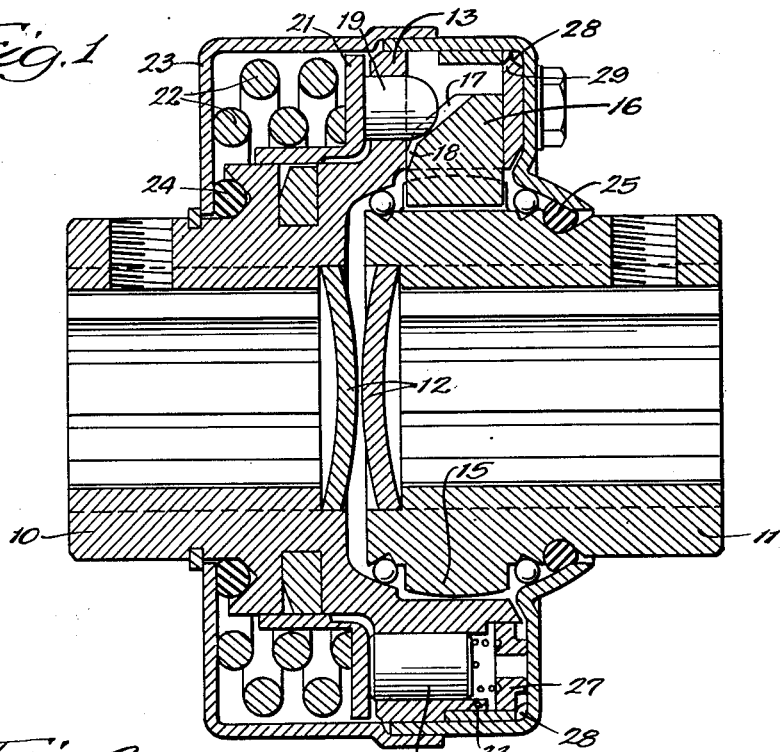
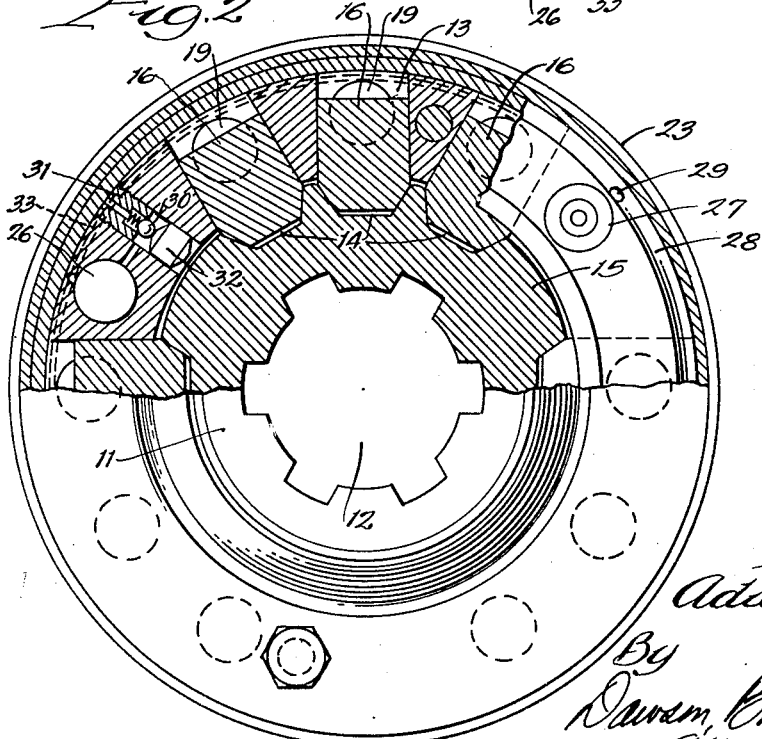
Inventor:
Adiel Y. Dodge,
By
Dawson, Ooms & Spryenberg,
Attorneys.

March 27, 1951 A. Y. DODGE 2,546,633
SPEED AND TORQUE RESPONSIVE COUPLING
Filed Feb. 8, 1946 2 Sheets-Sheet 2
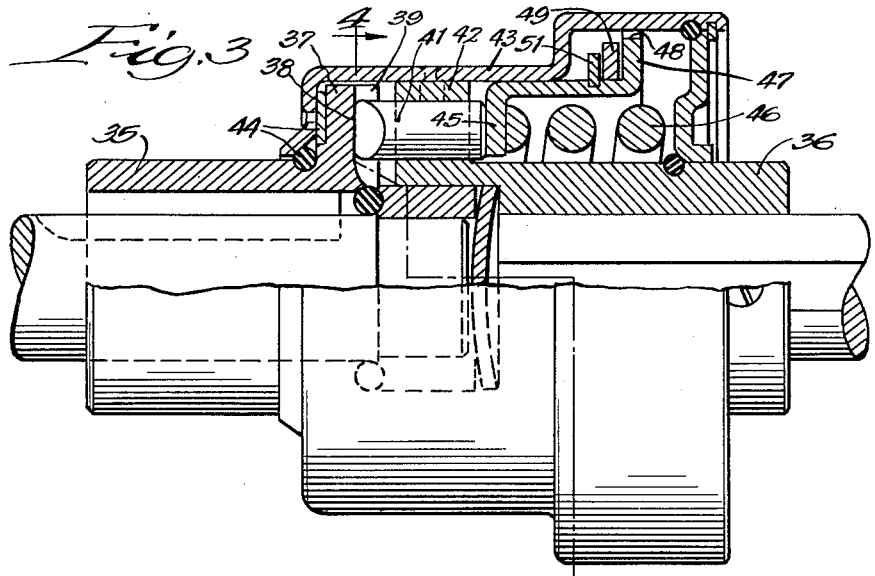
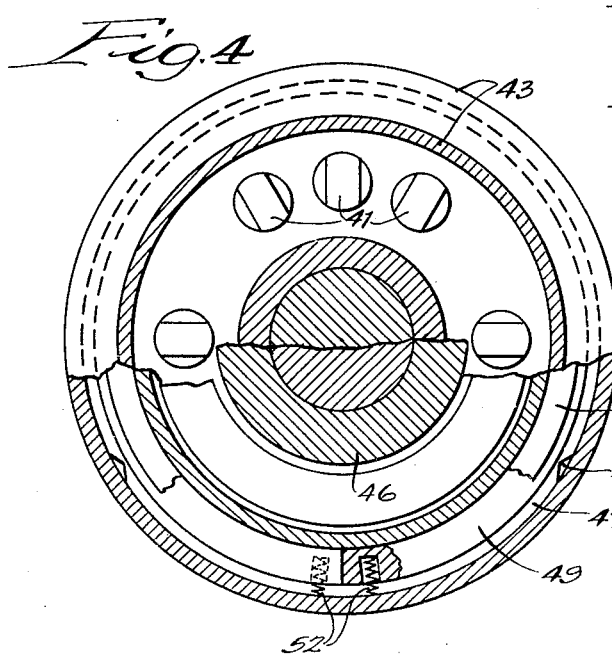
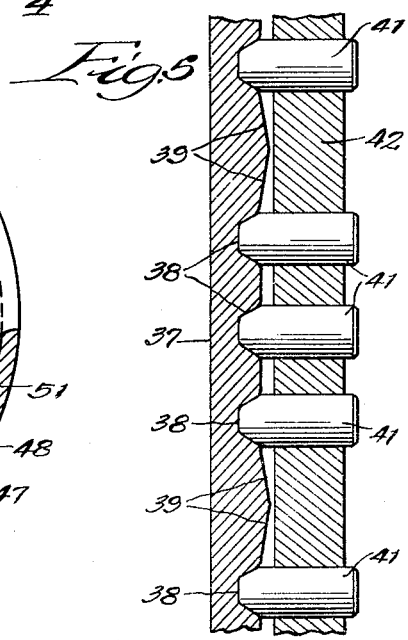
Inventor:
Adiel Y. Dodge,
By Dawson, Booth and Spangenberg,
Attorneys.

Patented Mar. 27, 1951

2,546,633

UNITED STATES PATENT OFFICE 2,546,633

SPEED AND TORQUE RESPONSIVE COUPLING

Adiel Y. Dodge, Rockford, Ill.

Application February 8, 1946, Serial No. 646,418

14 Claims. (Cl. 192—104)

This invention relates to couplings and more particularly to mechanical couplings which will release in response to predetermined torque loads.

In my Patent No. 2,238,583 there is disclosed and claimed a coupling of the type in which coupling elements are urged to driving engaged position by springs acting through cam surfaces. I have found that when strong springs are employed in such couplings to provide high torque capacity, the coupling elements tend to move too quickly toward engaged position. Thus the coupling elements may strike the driving notches during overrunning to produce a clicking effect which is objectionable in some cases.

It is one of the objects of the present invention to provide a coupling in which this clicking effect is eliminated.

Another object is to provide a coupling in which re-engagement of the coupling is retarded after it has been disengaged by torque overload. Preferably the retarding effect is produced hydraulically.

Still another object is to provide a coupling which can re-engage more readily at low than at high speeds.

A further object is to provide a coupling whose re-engagement is controlled hydraulically by a speed responsive valve.

The above and other objects and advantages of the invention will be more readily apparent from the following description when read in connection with the accompanying drawing, in which:

Figure 1 is an axial sectional view of a coupling embodying the invention;

Figure 2 is a broken transverse section of the coupling of Figure 1;

Figure 3 is a partial axial section of an alternative coupling;

Figure 4 is a section on the line 4—4 of Figure 3; and

Figure 5 is a developed sectional view showing the notches and driving elements.

The coupling of Figures 1 and 2 comprises coaxial driving and driven members 10 and 11 which are adapted to be keyed or splined to coaxial driving and driven shafts. To this end the members 10 and 11 are formed with tubular splined bores which are preferably closed by plugs 12 to prevent escape of oil from the coupling.

The member 10 is formed with a radially extending flange 13 which overlies the end portion of the member 11. This end portion of the member 11 is formed in its peripheray with a series of notches 14 preferably arranged in groups of three which are separated by relatively wide lands 15. As best seen in Figure 2 the lands 15 are formed with a gradually rising contour providing a gradual cam surface between the adjacent groups of notches for a purpose to appear later.

The flange portion 13 is formed with a series of radially extending bores corresponding in number and spacing to the notches 14 in which driving elements 16 are slidably mounted. The driving elements 16 are formed at their inner ends to engage the notches and at their outer ends are formed with connected cam surfaces 17 and 18 which lie at different angles as best seen in Figure 1. The driving elements 16 are adapted to be urged toward the notches by plungers or fingers 19 pressed toward the driving elements by a ring 21. Springs 22 engage the ring at one end, seat at their opposite ends against a housing 23 carried by the member 10 and held against axial movement thereon by a snap ring, as shown. Preferably the housing is sealed against the member 10 by a sealing ring 24 and has a flanged extension sealed against the member 11 by a similar ring 25 so that the housing is fluid tight.

In operation of the coupling as so far described, when the driving elements 16 are seated in the notches, they connect the members 10 and 11 for rotation together. At this time the plungers 19 engage the cam surfaces 17 so that the springs 22 will hold the driving elements in with a relatively high mechanical advantage. Upon overload, the camming effect of the notches on the ends of the driving elements will move the driving elements out, camming the plungers 19 to the left against the springs. When the driving elements are out the plungers 19 will engage the relatively flat cam surfaces 18 to reduce the mechanical advantage of the springs over the driving elements so that the driving elements will be urged in with a relatively small force.

With a construction of this kind I have found that when strong springs are employed to provide a large torque capacity, the driving elements tend to move in relatively rapidly so that they will strike the edges of the notches during overrunning. This effect is partially eliminated by the gradual cam contour of the lands 15 which press the driving elements out beyond the edges of the notches and which provide a gradual cam surface to be engaged by the driving elements during overrunning.

In order further to reduce the tendency of the driving elements to strike the notches during overrunning, there is provided according to the present invention retarding means to retard movement of the ring 21 toward the driving elements. As shown, the retarding means comprises pistons 26 slidably fitting in axial bores in the flange 13 and engaging the ring 21 at one end. The opposite end of the bores communicates past check valves 27 which are normally closed and which open toward the bores with an annular passage 28 formed in the housing 23. The passage 28 communicates through bores 29 with the radial bores in which the driving elements 16 are mounted. In this way when the driving elements are moved outward in response to overload, they will force liquid in the casing past the valves 27 to displace the pistons 26 to the left at the same time the ring 21 is cammed to the left by the action of the driving elements. When the pistons tend to return to the right toward re-engaged position, the valves 27 will close to trap the fluid in the right ends of the cylinders so that the ring will be held against movement to re-engaged position.

Escape of fluid from the cylinders to regulate re-engaging movement of the ring 21 is controlled by valves, as best seen in Figure 2. As shown, the valves comprise ball check members 30 which are adapted to seat against plugs 31 which may have bores therein communicating with the passage 28. The balls 30 are urged away from their seats by light springs and are adapted to be moved toward their seats by centrifugal weights 32 slidably mounted in the valve bores. With this construction when the speed of the member 10 is relatively high, the valves will be closed to prevent escape of fluid thereby preventing re-engagement of the coupling, but when the speed is such that the force on the weights 32 is less than 1 g. the weights will drop by gravity away from the balls allowing the valves to open so that fluid can escape. At this time movement of the ring 21 to the right is restricted only by the size of the fluid flow passages so that the coupling can return to engaged position.

In the construction shown three pistons are provided acting on the ring 21 so that at all times under low speed conditions at least one valve will be open and at least one will be closed by gravity. To permit movement of the ring under these conditions, the several cylinders are interconnected by an annular passage 33 so that fluid from all of the cylinders can flow through the open valve. Therefore, under low speed conditions when the rotation of the driving and driven members is near synchronism, the coupling can re-engage as soon as the driving elements are brought into register with the notches.

Figures 3 to 5 illustrate an alternative construction including driving and driven members 35 and 36 which are coaxially mounted on driving and driven shafts as shown. The member 35 is formed with a radially extending flange 37 which is provided in one face with spaced groups of driving notches 38 similar to the notches 14 of Figures 1 and 2. The lands between the groups of notches are formed with gradually rising contours as indicated at 39 to cam the driving elements beyond the edges of the notches during overrunning.

The notches 38 are adapted to be engaged by driving plungers 41 mounted for axial sliding movement in a flange 42 on the member 36. The flange 42 carries a housing 43 extending over the entire coupling mechanism and sealed to the flange 37 by sealing rings 44. Within the housing 43 is mounted a ring 45 urged toward the driving plungers by a spring 46 to press them into engagement with the notches. To retard engagement of the driving plungers with the notches, the ring 45 is formed with a flanged extension 47 slidably fitting against the interior of the housing 43 and formed at spaced points in its periphery with flow passages or notches 48. The passages 48 are adapted to be controlled by radially movable valve segments 49 which are mounted adjacent one face of the flange 47 and are held in place by a snap ring or the like 51. The segments 49 are normally urged inward by springs 52 seated in bores in the ends of the segments and engaging the housing 43.

In operation of this construction the parts are in driving condition, as shown, when the ring 45 is moved to the left by the spring 46 to press the ends of the plungers 41 into the notches 38. Upon a torque overload, the camming effect of the notches on the plungers will move the plungers and the ring 45 to the right to disengage the plungers from the notches. At this time fluid will flow from the right of the ring to the left thereof through the passages 48 and around the valve segments 49 which may move away from the flange 47 in response to pressure of fluid. When the spring attempts to return the ring to the left, pressure of the fluid will force the valve segments against the face of the flange 47 and as long as these segments are held in contact with the housing by centrifugal force, they will plug the flow passages 48 to prevent or to provide maximum restriction to movement of the ring and plungers. The coupling may, therefore, overrun freely.

When the speed is reduced so that the valve segments 49 will move in under the influence of the springs 52, the passages 48 will be opened to permit the ring and the plungers to move back to the left toward re-engaged position. In operation, therefore, this construction is substantially similar to that of Figures 1 and 2.

While two embodiments of the invention have been shown and described in detail, it will be understood that these are illustrative only and are not to be taken as a definition of the scope of the invention, reference being had for this purpose to the appended claims.

What is claimed is:

1. A coupling comprising coaxial driving and driven members connected for relative rotation but held against relative axial movement, one of said members being formed with driving notches, driving elements movably carried by the other member to engage the notches, spring means carried by said other member and operatively engaging the driving elements to urge the driving elements toward the notches and to be compressed by movement of the driving elements out of the notches, and means forming a fluid dashpot acting between the spring means and one of the members to restrict movement of the spring means in a direction to urge the driving elements toward the notches.

2. A coupling comprising coaxial driving and driven members, one of said members being formed with a plurality of separate driving notches, driving elements movably carried by the other member to engage the notches, a ring engageable with the driving elements to urge them toward the notches, a spring carried by said other member urging the ring toward the driving elements, and means forming a fluid dashpot acting between the ring and one of the members to restrict movement of the ring toward the driving elements.

3. A coupling comprising coaxial driving and driven members, one of said members being formed with driving notches, driving elements movably carried by the other member to engage the notches, spring means urging the driving elements toward the notches, means forming a speed responsive dashpot acting between the ring and one of the members to restrict movement of the spring means in a direction to move the driving elements toward the notches, and a speed responsive valve to control flow of fluid from the dashpot in response to the speed of one of the members.

4. A coupling comprising coaxial driving and driven members, one of said members being formed with driving notches, driving elements movably carried by the other member to engage the notches, spring means urging the driving elements toward the notches, means forming a speed responsive dashpot acting between the ring and one of the members to restrict movement of the spring means in a direction to move the driving elements toward the notches, said dashpot having an outlet passage the flow through which determines the restriction of the spring means, and a valve for said passage responsive to the speed of one of the members to maintain the passage more nearly closed at high speeds than at low speeds.

5. A coupling comprising coaxial driving and driven members connected for relative rotation but held against relative axial movement, a flange on one of the members formed in one face with a series of driving notches, a series of driving elements carried by the other member for movement into engagement with the driving notches, spring means carried by said other member urging the driving elements toward the notches, and means carried by said other member forming a fluid dashpot to restrict movement of the spring means toward the driving elements.

6. A coupling comprising coaxial driving and driven members, a flange on one of the members formed in one face with a series of driving notches, a series of driving elements carried by the other member for movement into engagement with the driving notches, spring means carried by said other member urging the driving elements toward the notches, means carried by said other member forming a fluid dashpot to restrict movement of the spring means toward the driving elements, and a speed responsive valve controlling the dashpot to provide a greater restriction at high speed than at low speed.

7. A coupling comprising coaxial driving and driven members, a flange on one of the members formed in one face with a series of driving notches, a series of driving elements carried by the other member for movement into engagement with the driving notches, a ring slidable on the other member and engageable with the driving elements to move them toward the notches, a spring carried by the other member urging the ring toward the driving elements, a housing inclosing the ring and spring and an extension on the ring slidably engaging the housing to form a fluid dashpot therewith.

8. A coupling comprising coaxial driving and driven members, a flange on one of the members formed in one face with a series of driving notches, a series of driving elements carried by the other member for movement into engagement with the driving notches, a ring slidable on the other member and engageable with the driving elements to move them toward the notches, a spring urging the ring toward the driving elements, a housing inclosing the ring and spring, an extension on the ring slidably engaging the housing to form a fluid dashpot therewith, the extension having a flow passage therethrough, and a speed responsive valve to control the flow passage.

9. A coupling comprising coaxial driving and driven members connected for relative rotation but held against relative axial movement, one of the members being formed with a series of spaced driving notches separated by lands which have a gradually rising contour, a series of driving elements slidably carried by the other member to engage the notches, spring means carried by said other member and operatively engaging the driving elements to urge the driving elements into engagement with the notches, the lands camming the driving elements away from the notches upon disengagement whereby the elements will not strike the notches during overrunning, and means forming a dashpot acting between the spring means and one of the members to restrict movement of the spring means in a direction to engage the driving elements with the notches.

10. A coupling comprising coaxial driving and driven members, one of the members being formed with a series of unevenly spaced notches separated by lands at least some of which have a gradually rising contour, a series of driving elements corresponding in number and spacing to the notches movably carried by the other member to engage the notches, a ring movably carried by the other member engaging the driving elements to move them toward the notches, a spring carried by the other member urging the ring toward the driving elements, the lands camming the driving elements and ring away from the notches upon disengagement, and means forming a dashpot acting between the ring and one of the members to restrict movement of the ring toward the driving elements.

11. A coupling comprising coaxial driving and driven members, one of said members being formed with peripheral driving notches, coupling elements carried by the other member for radial movement into and out of engagement with the notches, operating members movable axially of said other member to urge the coupling elements into the notches, a ring engaging the operating members to move them toward the coupling elements, a spring urging the ring against the operating members, and means forming a fluid dashpot acting between the ring and said other member to restrict movement of the ring toward the operating members.

12. A coupling comprising coaxial driving and driven members, one of said members being formed with peripheral driving notches, coupling elements carried by the other member for radial movement into and out of engagement with the notches, operating members movable axially of said other member to urge the coupling elements into the notches, a ring engaging the operating members to move them toward the coupling elements, a spring urging the ring against the operating members, a plunger engaging the ring, a one-way opening valve connecting one end of the plunger to the space radially beyond the coupling elements, and a speed responsive valve controlling discharge of fluid from said one end of the plunger.

13. A coupling comprising coaxial driving and driven members, one of said members being formed with peripheral driving notches, coupling elements carried by the other member for radial movement into and out of engagement with the notches, operating members movable axially of said other member to urge the coupling elements into the notches, a ring engaging the operating members to move them toward the coupling elements, a spring urging the ring against the operating members, the operating members and coupling elements being formed with engaging cam surfaces at least one of which has successive cam portions lying at different angles to produce a greater mechanical advantage of the springs over the coupling elements when they are in than when they are out of the notches, and means forming a fluid dashpot acting between the ring and said other member to restrict movement of the ring toward the operating members.

14. A coupling comprising coaxial driving and driven members, one of said members being formed with peripheral driving notches, coupling elements carried by the other member for radial movement into and out of engagement with the notches, operating members movable axially of said other member to urge the coupling elements into the notches, a ring engaging the operating members to move them toward the coupling elements, a spring urging the ring against the operating members, the operating members and coupling elements being formed with engaging cam surfaces at least one of which has successive cam portions lying at different angles to produce a greater mechanical advantage of the springs over the coupling elements when they are in than when they are out of the notches, said other member being formed with an axially extending bore communicating at one end with the space radially beyond the coupling elements, a check valve opening toward the bore controlling said communication, a piston in the bore engageable with the ring to restrict movement thereof toward the operating members, and a speed responsive valve controlling discharge of fluid from said one end of the bore.

ADIEL Y. DODGE.

REFERENCES CITED

The following references are of record in the file of this patent:

UNITED STATES PATENTS

| Number | Name | Date |
| --- | --- | --- |
| 1,479,707 | Fleischer | Jan. 1, 1924 |
| 1,496,059 | Lanzetta | June 3, 1924 |
| 1,942,217 | Paul | Jan. 2, 1934 |
| 2,293,787 | Worden | Aug. 25, 1942 |
| 2,366,841 | Dodge | Jan. 9, 1945 |

FOREIGN PATENTS

| Number | Country | Date |
| --- | --- | --- |
| 158,770 | Germany | Mar. 7, 1905 |

OTHER REFERENCES

Ser. No. 362,883, Wittkop (A. P. C.), published May 18, 1943.